(12) United States Patent
Scheyer et al.

(10) Patent No.: US 10,151,586 B2
(45) Date of Patent: Dec. 11, 2018

(54) SPIRIT LEVEL

(71) Applicant: SOLA-Messwerkzeuge GmbH, Goetzis (AT)

(72) Inventors: Wolfgang Scheyer, Goetzis (AT); Lukas Zwing, Hard (AT); Gerd Stroehle, Feldkirch (AT); Helmut Weissenbach, Zwischenwasser (AT)

(73) Assignee: SOLA-MESSWERKZEUGE GMBH, Goetzis (AT)

( * ) Notice: Subject to any disclaimer, the term of this patent is extended or adjusted under 35 U.S.C. 154(b) by 136 days.

(21) Appl. No.: 15/196,595

(22) Filed: Jun. 29, 2016

(65) Prior Publication Data

US 2017/0010097 A1    Jan. 12, 2017

(30) Foreign Application Priority Data

Jul. 7, 2015  (AT) .................................. A 441/2015

(51) Int. Cl.
 *G01C 9/34*   (2006.01)

(52) U.S. Cl.
 CPC ..................... *G01C 9/34* (2013.01)

(58) Field of Classification Search
 CPC .................... G01C 9/34; G01C 9/28
 USPC .......................... 33/383, 384, 386
 See application file for complete search history.

(56) References Cited

U.S. PATENT DOCUMENTS

| | | | | |
|---|---|---|---|---|
| 73,670 A * | 1/1868 | Tate | ......... | G01C 9/28 33/386 |
| 813,561 A * | 2/1906 | Leonhart | ......... | G01C 9/28 33/384 |
| 926,661 A * | 6/1909 | Leiby | ......... | G01C 9/28 33/383 |
| 1,012,668 A * | 12/1911 | Lofberg | ......... | G01C 9/28 33/383 |
| 1,267,456 A * | 5/1918 | Runge | ......... | G01C 9/28 33/383 |
| 1,435,365 A * | 11/1922 | Zieman | ......... | G01C 9/24 33/383 |
| 1,489,572 A * | 4/1924 | Bennewitz | ......... | G01C 9/24 248/214 |

(Continued)

FOREIGN PATENT DOCUMENTS

| | | |
|---|---|---|
| CH | 343655 | 12/1959 |
| CN | 101311671 | 11/2008 |

(Continued)

OTHER PUBLICATIONS

English translation of search report dated Jun. 1, 2018 in Chinese Patent App No. 201610527327.3.

*Primary Examiner* — Christopher W Fulton
(74) *Attorney, Agent, or Firm* — Wenderoth, Lind & Ponack, L.L.P.

(57) ABSTRACT

A spirit level has a hollow profile member as the spirit level body and at least one bubble level with a bubble level holder. The bubble level holder is mounted moveably in the spirit level body, and the bubble level holder has an opening into which a fixing element can be introduced through a wall of the spirit level body. The fixing elements prevents a displacement of the bubble level holder parallel to the longitudinal axis of the spirit level body, and allows a movement of the bubble level holder normal to a measurement surface of the spirit level body.

7 Claims, 4 Drawing Sheets

(56) References Cited

U.S. PATENT DOCUMENTS

| | | | | |
|---|---|---|---|---|
| 1,757,283 A * | 5/1930 | Zieman | ............ | G01C 9/28 |
| | | | | 33/384 |
| 2,557,291 A * | 6/1951 | Hubbard | ............ | G01C 9/28 |
| | | | | 33/386 |
| 4,335,524 A * | 6/1982 | Schimming | ............ | G01C 9/28 |
| | | | | 33/379 |
| 4,996,777 A * | 3/1991 | Grosz | ............ | G01C 9/28 |
| | | | | 33/379 |
| 5,111,589 A | 5/1992 | Tate | | |
| 5,992,033 A | 11/1999 | Scarborough | | |
| 6,176,020 B1 | 1/2001 | Scarborough | | |
| 7,600,324 B2 * | 10/2009 | Maruyama | ............ | G01C 9/28 |
| | | | | 33/365 |
| 7,975,393 B2 | 7/2011 | Sparrow | | |
| 2005/0160610 A1 | 7/2005 | Scheyer | | |
| 2009/0320303 A1 | 12/2009 | Sparrow | | |

FOREIGN PATENT DOCUMENTS

| | | |
|---|---|---|
| CN | 101448678 | 6/2009 |
| DE | 39 36 591 | 5/1991 |
| EP | 1 559 997 | 8/2005 |
| WO | 79/00672 | 9/1979 |

\* cited by examiner

State of the art

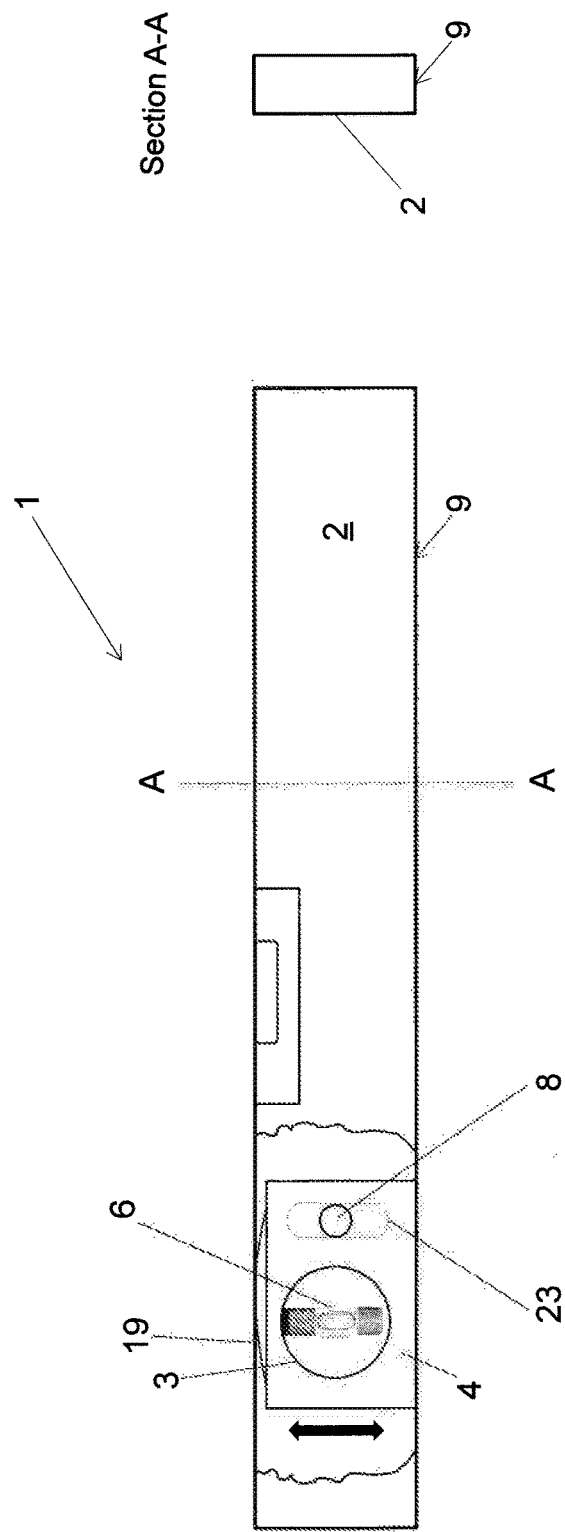

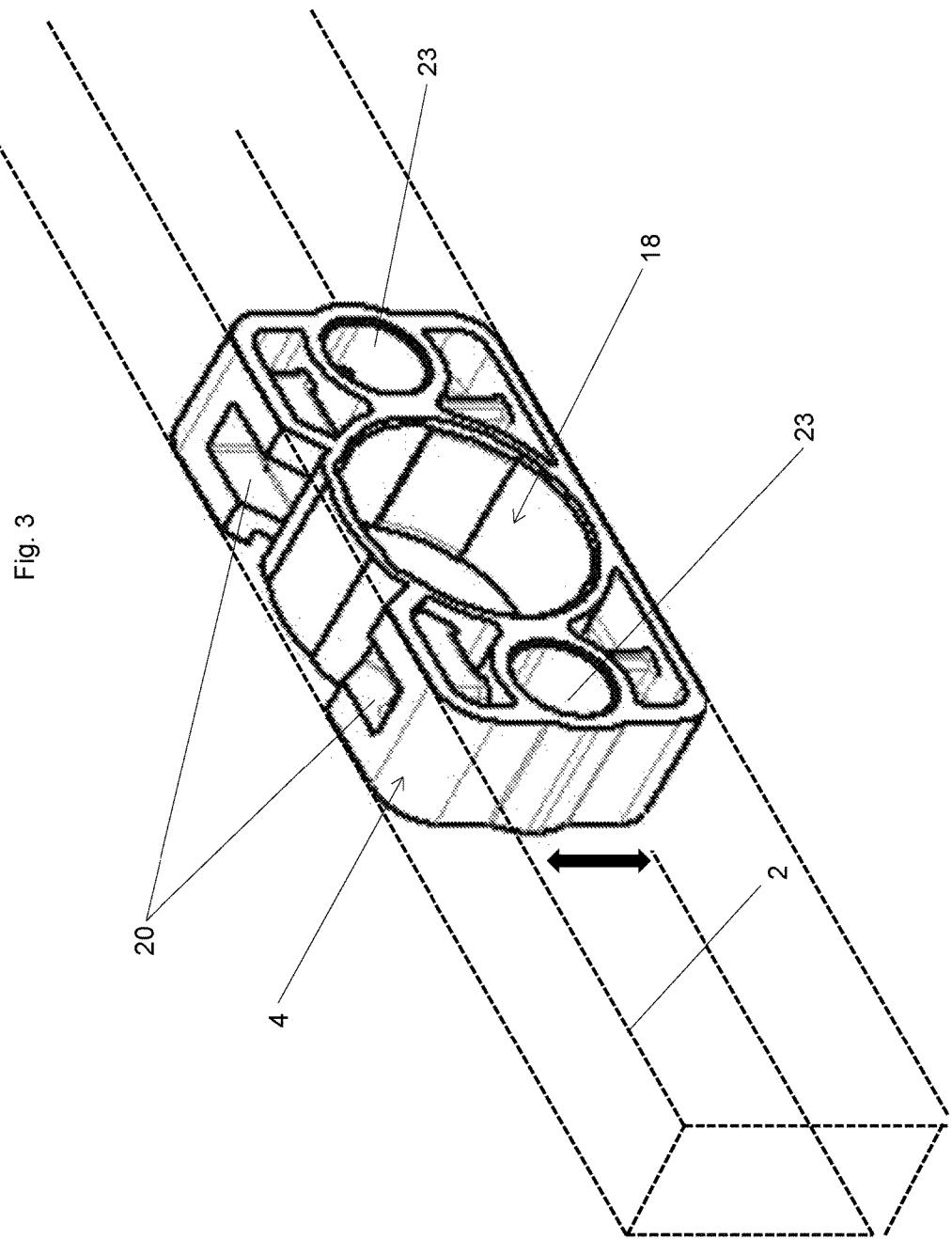

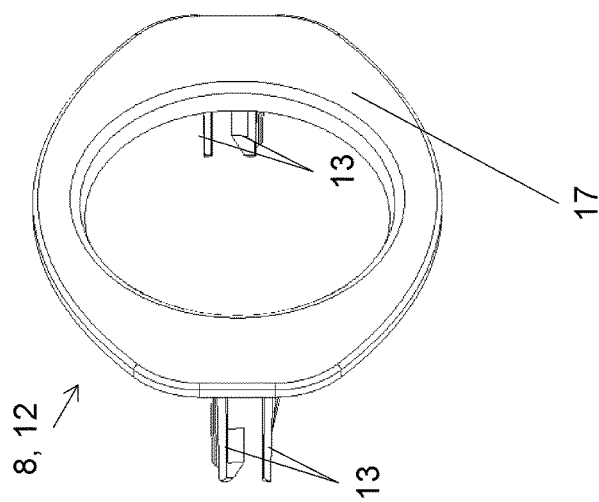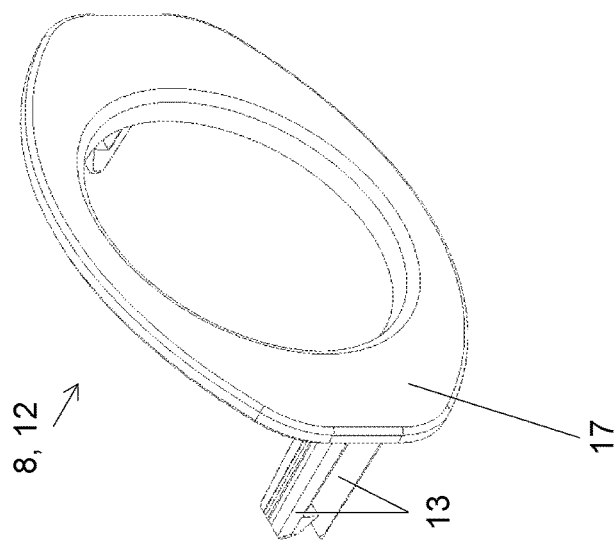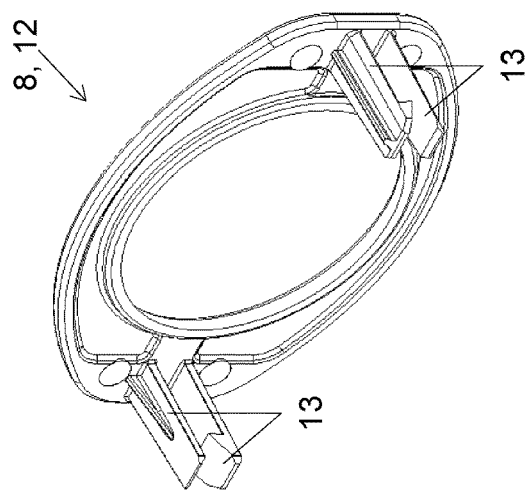

SPIRIT LEVEL

BACKGROUND OF THE INVENTION

Spirit levels are frequently subjected to severe temperature fluctuations in use. The difference in the coefficients of thermal expansion between a spirit level body which is usually made from aluminum and a bubble level body which is generally made from plastic or a bubble level holder gives rise to thermal stresses and thermal expansion phenomena between the spirit level body and the bubble level body or the bubble level holder. It is particularly disadvantageous if the relative movement of the bubble level body or bubble level holder and the spirit level body leads to a loss in the calibration position of the bubble level.

Approaches for overcoming that technical problem are known from the state of the art.

WO 7900672 discloses a spirit level whose bubble level is displaceable by an adjusting device in an accommodating space in the housing relative to a measurement surface. By virtue of the fact that the closure body which accommodates the adjusting device is in the form of a separate part, the material thereof and thus its coefficient of thermal expansion can be so selected that a difference in thermal expansion between the bubble level and the housing is compensated for.

SUMMARY OF THE INVENTION

The object of the present invention is to provide a spirit level with compatibility in relation to temperature fluctuations, that is improved over the state of the art, and with a simple structure.

The fact that the bubble level holder is mounted moveably in the spirit level body and the bubble level holder has an opening into which a fixing element can be introduced through a wall of the spirit level body. The fixing element prevents displacement of the bubble level holder parallel to the longitudinal axis of the spirit level body, and allows a free movement of the bubble level holder normal to a measurement surface of the spirit level body to provide improved compatibility of the spirit level in relation to temperature fluctuations.

The expression "compatibility in relation to temperature fluctuations" is used here to mean that the spirit level preserves a high degree of accuracy when being involved in temperature fluctuations.

To retain a high degree of accuracy for the spirit level when it is involved in temperature fluctuations, the apparently paradoxical measure is adopted of mounting the bubble level holder moveably in the spirit level body.

When a change in temperature occurs, high stresses occur between the spirit level body and the bubble level holder, whereby the calibration position of the bubble level can be lost.

In experiments the applicant found that, with a moveable mounting for the bubble level holder in the spirit level body, only low stresses occur between the bubble level holder and the spirit level body. Thus, there is no loss of a calibration position of the spirit level.

In contrast, fixing methods using adhesive or pressing of the bubble level holder in the spirit level body are detrimental in terms of compatibility of the spirit level in relation to temperature fluctuations. Here, more specifically no relative movement is possible between the bubble level holder and the spirit level body.

The opening in the bubble level holder forms a guide for the fixing element so that a relative movement of the bubble level holder in the spirit level body along a direction normal to the measurement surface of the spirit level body is permitted.

The fixing element can be introduced by a wall of the spirit level body. For that purpose, provided in at least one wall of the spirit level body is an aperture, by which the fixing element can be introduced through the wall of the spirit level body into the opening in the bubble level holder.

To make the spirit level insensitive to shocks as can occur for example when a spirit level is dropped, it is necessary for the bubble level holder to be fixed in relation to displacement on the longitudinal axis of the spirit level body.

The at least one aperture for introduction of the fixing element is preferably provided at a side surface (cheek surface) of the spirit level body. That means the surface which forms the long side, in a cross-section through the profile forming the spirit level body.

Alternatively, the at least one aperture is provided at a narrow side of the spirit level body. In that case, the corresponding opening in the bubble level holder can be formed by a bore normal to a measurement surface. The fixing element can be formed as sliding in the bore.

Because the at least one aperture has such tolerance with the fixing element that the fixing element is pressed in the aperture, no further securing of the fixing element is required.

The measurement surface of a spirit level is formed by the outside wall of the narrow side of the profile member forming the spirit level body, on the side opposite to the flat bubble level (horizontal bubble level). When a usual rectangular cross-section is involved, that side is therefore a narrow side of the rectangular profile.

The fixing element can be in the form of a sleeve. The term 'sleeve' is used to denote a profile member of hollow cross-section.

The fixing element can be in the form of a stud. In this variant, the fixing element has a filled cross-section.

The fixing means can be in the form of a two-part pin member with snap-action catches, in which the halves of the two-part pin member can be introduced through oppositely disposed walls of the spirit level body and can be fixed together by snapping of the snap-action catches.

Preferably, the opening in the bubble level holder is in the form of a slot. The slot serves as a guide element for the fixing element which can be inserted. In that arrangement, the longitudinal extent of the slot extends in such a way as to permit a movement of the bubble level holder normal to the measurement surface of the spirit level body.

It should be mentioned that for fixing bubble level holders in the spirit level body, it is known to use so-called nail sleeves. Nail sleeves are bodies in the form of a cylindrical ring, which are pressed into the spirit level body, being pressed into a bore in the bubble level holder. In tests conducted by the applicant, however, it was found that, when temperature changes occur, a nail sleeve has a detrimental effect on the accuracy of the spirit level. More specifically, if the bubble level holder performs a relative movement, caused by thermal expansion, in the spirit level body along an axis normal to a measurement surface of the spirit level, then a nail sleeve can act as a pivot point in relation to the bubble level holder and thus add a rotational movement to the purely translatory movement caused by the thermal expansion. That rotational movement means that the calibration position of the bubble level is lost.

The provision, however, of a guide which prevents a displacement of the bubble level holder parallel to the longitudinal axis of the spirit level body and allows a movement of the bubble level body normal to a measurement surface of the spirit level body means that the above-described negative effect when thermal expansion takes place does not occur, and the bubble level retains its calibration position.

Preferably, the bubble level holder is fixed in the spirit level body by at least one spring. The at least one spring presses the bubble level holder against the inside wall of the spirit level body. Preferably, the bubble level holder is braced in the spirit level body between the narrow sides of the profile member forming the spirit level body. Fixing by way of a spring allows a movement of the bubble level holder, as described hereinbefore. The spring can be, for example, in the form of a leaf spring or a coil spring. A plurality of springs can be provided.

The invention is particularly suitable for round bubble levels, that is to say those bubble levels which serve for reading off the vertical orientation of the spirit level (vertical bubble levels). Round bubble levels generally involve a can-shaped, that is to say cylindrical, configuration.

FIG. 1 shows a spirit level 1 according to the state of the art. The spirit level 1 has two plane-parallel measurement surfaces 9. A bubble level holder 4 is clamped in the spirit level body 2 by being oversize in relation thereto, and is possibly additionally glued in place. The bubble level holder 4 is here secured against displacement along the longitudinal axis in the spirit level body 2 by a nail sleeve 21. Also indicated is the bubble level 3, here in the form of a round bubble level, which is fitted into the bubble level holder 4. When temperature fluctuations occur, there is a danger of the bubble level 3 losing its calibration position as a tilting moment can occur with respect to the nail sleeve 21.

BRIEF DESCRIPTION OF THE DRAWINGS

The invention is described in greater detail by reference to the following Figures in which:

FIG. 2 shows a spirit level in a first embodiment,

FIG. 3 shows a bubble level holder in an embodiment, and

FIGS. 4a through 4c show a fixing element in an embodiment.

DETAILED DESCRIPTION OF THE INVENTION

Figure 1:
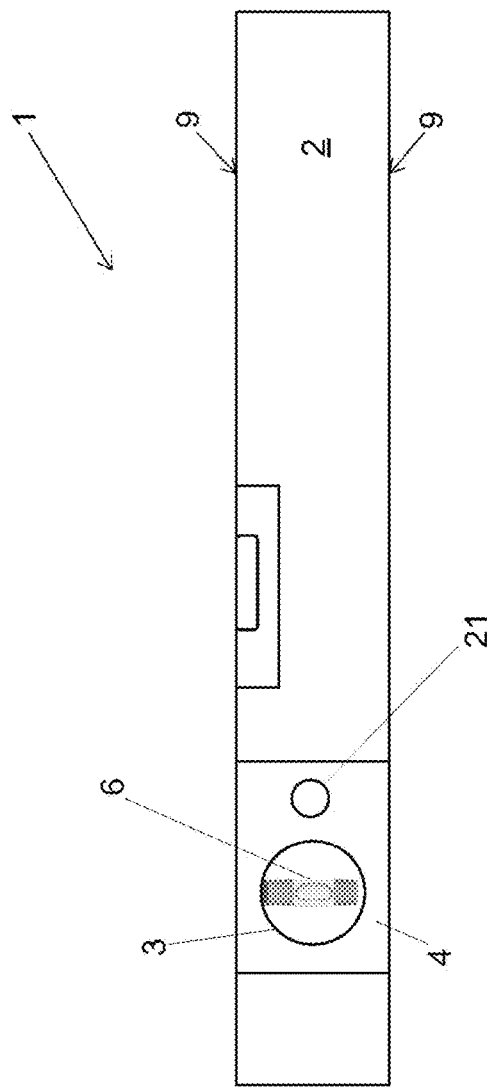
FIG. 1 shows a section of a spirit level according to the state of the art.

FIG. 2 shows a first embodiment of the spirit level 1 according to the invention. The bubble level holder 4 is braced in relation to the inside wall of the spirit level body 2 by a spring 19 (here in the form of a leaf spring).

An opening 23 in the bubble level holder 4 is in the form of a slot extending perpendicular to a longitudinal axis of the spirit level body 2. A fixing element 8 is introduced into the opening 23 through the walls of the spirit level body 2. Thus, when thermal expansion occurs between the spirit level body 2 and the bubble level holder 4, a relative free movement of the bubble level holder 4 can take place along the guide formed by the opening 23 and the fixing element 8 in a direction normal to the measurement surface 9 of the spirit level body 2 without a tilting moment being imparted to the bubble level holder 4. The direction of movement of the bubble level holder 4, as can be caused by thermal expansion within the spirit level body 2, as indicated by a solid black arrow. For the sake of completeness, a section A-A through the spirit level body 2 is shown, which in the present embodiment has a rectangular hollow profile.

FIG. 3 shows a possible configuration of the bubble level holder 4. The bubble level holder 4 has a first orifice 18 for receiving a bubble level 3. Also provided on the bubble level holder 4 is a receiving part 20 for receiving one or more springs 19 (not shown here). The bubble level holder 4 can be braced against the inside wall of a spirit level body 2 by the spring or springs 19. In the present example, the receiving part 20 is designed for the insertion of a leaf spring. A spirit level body 2 is indicated in broken lines in order to clearly show the installation position of the bubble level holder 4.

The fixing element 8 (not shown here) can be inserted into the openings 23 in the installation position of the bubble level holder 4 through corresponding apertures in the spirit level body 2. The openings 23 are in the form of slots, the longitudinal axis of the opening 23 being transverse relative to the longitudinal axis of the spirit level body 2. In that way, the bubble level holder 4 is mounted in the spirit level body 2 in a way which allows a free movement of the bubble level holder 4 in the event of thermal expansion (direction of movement indicated by the solid black arrow) while at the same time the bubble level holder 4 is secured against displacement in the longitudinal direction of the spirit level 1 (for example in the event of shocks).

As the movements to be expected by virtue of thermal expansion are very slight (a few $\frac{1}{10}$ths of a millimeter), the longitudinal extent of the openings 23 can be only little greater than their width.

The spring or springs 19 are preferably made of metal, preferably steel. Metal springs have better long-term stability and maintain the spring force, in comparison with springs of plastic.

Adjustment of a bubble level 3 in the bubble level holder 4 can be effected prior to or after installation.

FIGS. 4a through 4c show various views of a fixing element 8 in the form of a two-part stud 12. A respective half is shown. In the illustrated embodiment, the stud 12 also forms a cover 17 for the bubble level 3.

The studs 12 can be introduced by suitable apertures in the spirit level body 2 into the opening 23 (see in that respect for example FIG. 3) and can be connected together by snap-action catches 13.

LIST OF REFERENCES 1 spirit level
2 spirit level body
3 bubble level
4 bubble level holder
8 fixing element
9 measurement surface
12 stud
13 snap-action catch
17 cover
18 orifice
19 spring
20 receiving means
21 nail sleeve

The invention claimed is:

1. A spirit level comprising:
a spirit level body formed as a hollow profile member; and
a bubble level with a bubble level holder,
wherein the bubble level holder is mounted moveably in the spirit level body, the bubble level holder having an opening into which a fixing element is introduced through a wall of the spirit level body, the fixing element and the bubble level holder are configured to prevent a displacement of the bubble level holder in a direction parallel to the longitudinal axis of the spirit level body and to allow a free movement of the bubble level holder in a direction normal to a measurement surface of the spirit level body.

2. The spirit level as set forth in claim 1, wherein the fixing element is in the form of a sleeve.

3. The spirit level as set forth in claim 1, wherein the fixing element is in the form of a stud.

4. The spirit level as set forth in claim 1, wherein the fixing element is formed as a two-part pin member with snap-action catches, wherein halves of the two-part pin member are introduced through oppositely disposed walls of the spirit level body and are fixed together by snapping of the snap-action catches.

5. The spirit level as set forth in claim 1, wherein the opening is formed as a slot.

6. The spirit level as set forth in claim 1, wherein the bubble level holder is fixed in the spirit level body by at least one spring.

7. The spirit level as set forth in claim 1, wherein the bubble level is formed as a vertical bubble level of the spirit level.

* * * * *